(12) United States Patent
Baker et al.

(10) Patent No.: US 11,787,065 B2
(45) Date of Patent: Oct. 17, 2023

(54) GARMENT BAND ATTACHMENT SYSTEMS AND METHODS

(71) Applicant: SoftWear Automation, Inc., Cumming, GA (US)

(72) Inventors: Michael J. Baker, Acworth, GA (US); Luther Lloyd, III, Dallas, GA (US)

(73) Assignee: SOFTWEAR AUTOMATION, INC., Cumming, GA (US)

( * ) Notice: Subject to any disclaimer, the term of this patent is extended or adjusted under 35 U.S.C. 154(b) by 0 days.

(21) Appl. No.: 17/687,931

(22) Filed: Mar. 7, 2022

(65) Prior Publication Data
US 2022/0184817 A1  Jun. 16, 2022

Related U.S. Application Data

(62) Division of application No. 16/950,546, filed on Nov. 17, 2020, now Pat. No. 11,267,134.

(51) Int. Cl.
| | |
|---|---|
| *A41H 43/02* | (2006.01) |
| *A41H 43/04* | (2006.01) |
| *D05B 21/00* | (2006.01) |
| *D05B 27/10* | (2006.01) |
| *D05B 35/06* | (2006.01) |
| *B25J 15/00* | (2006.01) |

(52) U.S. Cl.
CPC .............. *B25J 15/00* (2013.01); *A41H 43/02* (2013.01); *A41H 43/04* (2013.01); *D05B 21/007* (2013.01); *D05B 27/10* (2013.01); *D05B 35/06* (2013.01)

(58) Field of Classification Search
CPC ...... D05B 35/06; D05B 21/007; D05B 27/10; B25J 15/00; A41H 43/02; A41H 43/04
See application file for complete search history.

(56) References Cited

U.S. PATENT DOCUMENTS

| | | | |
|---|---|---|---|
| 5,419,268 A * | 5/1995 | Fyler .................. | D05B 23/00 |
| | | | 112/470.14 |
| 5,582,122 A | 12/1996 | Funderburk et al. | |
| 5,709,162 A | 1/1998 | Pagett et al. | |
| 6,035,794 A | 3/2000 | Keeton | |
| 6,055,921 A | 5/2000 | Olewicz et al. | |
| 2008/0196136 A1 | 8/2008 | Fellouhe et al. | |

OTHER PUBLICATIONS

International Search Report for PCT/US2021/072462 dated Apr. 7, 2022.

* cited by examiner

*Primary Examiner* — Nathan E Durham
(74) *Attorney, Agent, or Firm* — Thomas | Horstemeyer, LLP (57) ABSTRACT

Various examples are provided related to attachment of bands such as, e.g., collar or neck bands, sleeve bands, wrist bands, waist bands and ankle bands, etc. to a garment opening. In one example, among others, a band can be attached to a garment by loading the band between rollers in a joining position, positioning an opening of a garment extending between control surface mandrels over the band, and attaching the band to the garment along the edge of the opening.

20 Claims, 8 Drawing Sheets

GARMENT BAND ATTACHMENT SYSTEMS AND METHODS

CROSS REFERENCE TO RELATED APPLICATIONS

This application claims priority to, and the benefit of, co-pending U.S. non-provisional application entitled "Garment Band Attachment Systems and Methods" having Ser. No. 16/950,546, filed Nov. 17, 2020, which is hereby incorporated by reference in its entirety.

BACKGROUND

In garment production, attaching a collar to the neck of the garment is one of the most difficult operations. The closed loop of the collar band offers specific challenges. In manual sewing operations, maintaining consistent stretching of the collar band and garment material while keeping the collar band aligned with the garment opening during sewing is a skill that takes time to master. For fully automated processes, this process is complicated by not being carried out on a flat work surface. Control of the different variables can present complications that can prevent consistent product production.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

BRIEF DESCRIPTION OF THE DRAWINGS

The accompanying drawings illustrate various examples of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles. Moreover, in the drawings, like reference numerals designate corresponding parts throughout the several views.

DETAILED DESCRIPTION

Disclosed herein are various examples related to automation of sewing or bonding using robots. Reference will now be made in detail to the description of the embodiments as illustrated in the drawings. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems, and methods are now described.

Embodiments of the present disclosure will be described hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
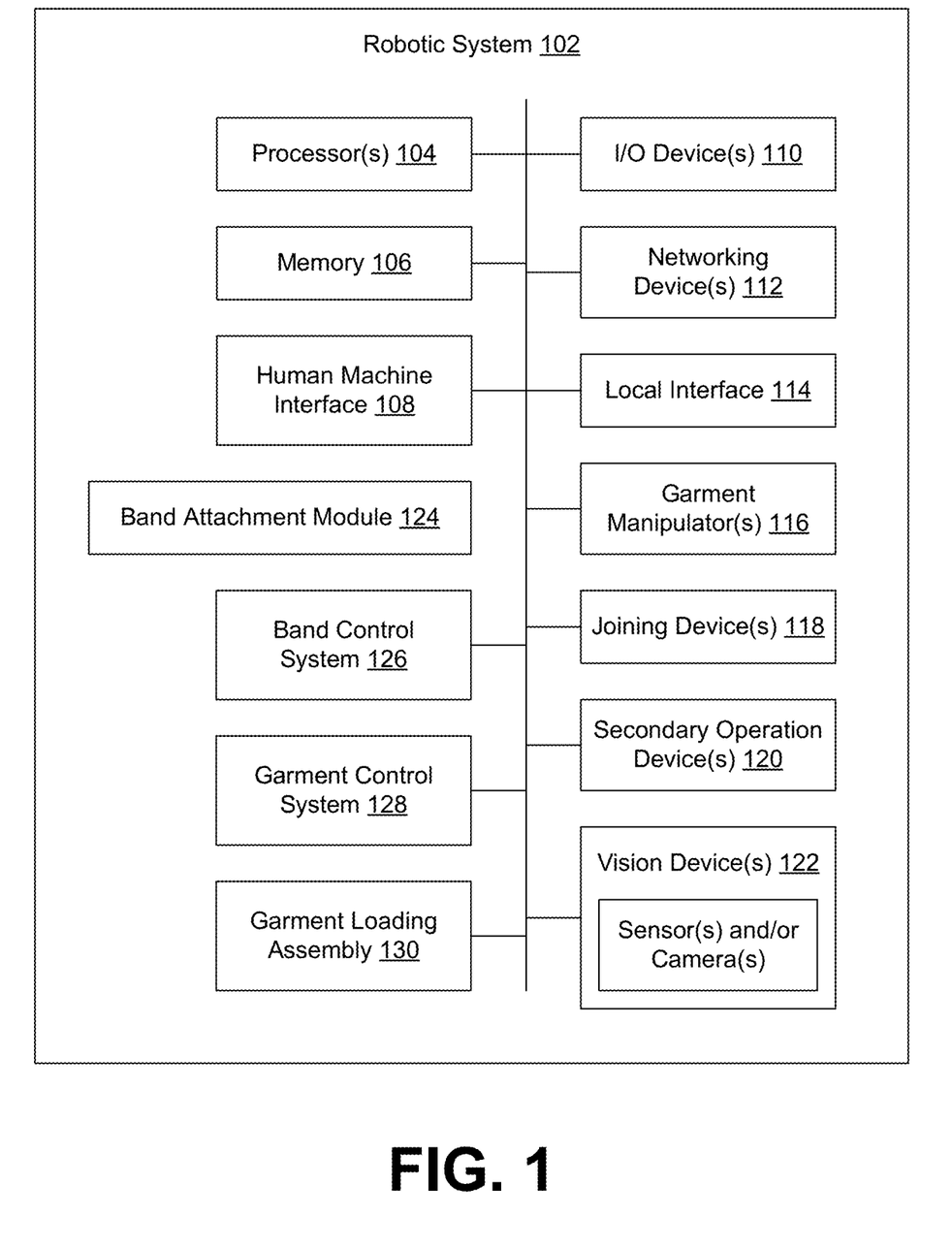
FIG. 1 illustrates an example of a garment band attachment system, according to various embodiments of the present disclosure.

Referring to FIG. 1, shown is an example of a system that can be used for attachment of bands around openings in garments. In the context of this disclosure, a garment refers to garments or portions of garments being processed by the system for the attachment of the bands. A band is a closed loop of approximately equal width such as, e.g., collar or neck bands, sleeve bands, wrist bands, waist bands and ankle bands, etc. The band can be sewn closed or can be formed as a continuous band. The bands can be attached to garment openings such as, e.g., t-shirt crew neck collars, polo shirt sleeve ends, hoodie sleeve ends, hoodie bottom ends, etc. The openings include a continuous edge which can include local discontinuities, but not large-scale sharp corners.

As illustrated in the example of FIG. 1, the system can comprise a robotic system 102, which can include a processor 104, memory 106, an interface such as, e.g., a human machine interface (HMI) 108, I/O device(s) 110, networking device(s) 112, and a local interface 114. The robotic system can also include garment manipulator(s) 116, a joining device 118, secondary operation device(s) 120, and/or vision device(s) 122. The vision device(s) 120 can comprise a sensor or camera such as, e.g., an RGB camera, an RGB-D camera, a near infrared (NIR) camera, stereoscopic camera, photometric stereo camera (single camera with multiple illumination options), etc. Additionally, the robotic system 102 can include a band attachment module 124, a band control system 126, a garment control system 128, and a garment loading apparatus 130, which may be utilized in the processing of the garments.

The robotic system 102 can position, e.g., a collar band with respect to a corresponding garment opening while the collar band is attached around the garment opening by the joining device 118. A garment on the garment control system 128 can be advanced to align an opening with a band on the band control system 126, which can control positioning of the garment opening with respect to the band while the edges are being joined together. The garment control system 128 can be size adjustable to facilitate attachment of bands of different sizes. When the joining (e.g., sewing or bonding) is complete, the band attachment module 124 can initiate removal of the processed garment from the garment control system 128, e.g., by separating the garment control system 128 from the band control system 126. The band and garment can be manually loaded on and/or removed from the band and garment control systems 126 and 128. In more fully automated processes, the garment manipulator(s) 116 can be used to autonomously install and/or remove the band and garment on the band and garment control systems 126 and 128.

The processor 104 can be configured to decode and execute any instructions received from one or more other electronic devices or servers. The processor can include one or more general-purpose processors (e.g., INTEL® or Advanced Micro Devices® (AMD) microprocessors) and/or one or more special purpose processors (e.g., digital signal processors or Xilinx® System on Chip (SOC) field programmable gate array (FPGA) processor). The processor 104 may be configured to execute one or more computer-readable program instructions, such as program instructions to carry out any of the functions described in this description.

The Memory 106 can include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The Memory 106 can comprise modules that can be implemented as a program executable by processor(s) 104.

The interface(s) or HMI 108 can either accept inputs from users or provide outputs to the users or may perform both the actions. In one case, a user can interact with the interfaces using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interfaces can either be implemented as a command line interface (CLI), a graphical user interface (GUI), a human machine interface (HMI), a voice interface, or a web-based user-interface.

The input/output devices or I/O devices 110 of the robotic system 102 can comprise components used to facilitate connections of the processor 104 to other devices such as, e.g., garment manipulator(s) 116, joining device 118, secondary operation device(s) 120, vision device(s) 122, band control system 126, garment control system 128, and/or garment loading apparatus 130 and can, for instance, comprise one or more serial, parallel, small system interface (SCSI), universal serial bus (USB), IEEE 1394 (i.e. Firewire™), or other appropriate connection elements.

The networking device(s) 112 of the robotic system 102 can comprise the various components used to transmit and/or receive data over a network. The networking device(s) 112 can include a device that can communicate both inputs and outputs, for instance, a modulator/demodulator (i.e. modem), a radio frequency (RF) or infrared (IR) transceiver, a telephonic interface, a bridge, a router, as well as a network card, etc.

The local interface 114 of the robotic system 102 can be, for example, but not limited to, one or more buses or other wired or wireless connections, as is known in the art. The local interface 114 can have additional elements, which are omitted for simplicity, such as controllers, buffers (caches), drivers, repeaters, and receivers, to enable communications. Further, the local interface 114 can include address, control, and/or data connections to enable appropriate communications among the components.

The garment manipulator(s) 116 of the robotic system 102 can facilitate positioning or installing product material(s) in preparation for and/or after the joining operations. For example, the collar band can be positioned or installed on the band control system 126 using one or more end effector on, e.g., an industrial robot or other actuator (e.g., pneumatic or servo actuators) or appropriate manipulation assembly. Industrial robots include, e.g., articulated robots, selective compliance assembly robots (SCARA), delta robots, and cartesian coordinate robots (e.g., gantry robots or x-y-z robots). Industrial robots can be programmed to carry out repetitive actions with a high degree of accuracy or can exhibit more flexibility by utilizing, e.g., machine vision and machine learning. The garment body can also be positioned or installed on the garment control system 128 using end effectors on an industrial robot or other manipulator or appropriate manipulation assembly. The garment manipulator(s) 116 can also be used to remove the processed garment from, e.g., the garment control system 128.

The joining device 118 of the robotic system 102 facilitates joining (e.g., sewing or bonding) the product materials together and can be configured to join a perimeter of a band to a garment opening. The joining device 118 can include, e.g., a sewing machine or a bonding apparatus (e.g., ultrasonic welding, thermal bonding, gluing or other bonding or joining technology). For example, a cylinder bed overlock sewing machine or other sewing machine (e.g., chain stitch machine, lock stitch machine, etc.) can be used. The joining device 118 can be configured to sew or otherwise bond or join (e.g., ultrasonic welding) material together along a perimeter or other defined path. The joining device 118 can sufficiently combine the band and garment such that they can remain connected through the intended life of the garment. In some embodiments, a secondary process such as, e.g., the addition of reinforcing tape can be carried out to enhance the connection of the band and garment. A feed assembly of the joining device 118 can be used to control the feed of material through the joining device 118. For example, a feed dog of a sewing machine, a welding mechanism of an ultrasonic welder, belts, rollers or other feeding methods can be used. In addition, the joining device 118 can include a knife device (e.g., a tail knife or chain cutter) or other separation device in order to cut or sever the joining medium such as, e.g., sewing threads, materials from the workpiece, etc.

The secondary operation device(s) 120 can include stacking device(s), folding device(s), label manipulation device(s), and/or other device(s) that assist with the preparation, installation, removal and/or finishing of the processed product.

The vision device(s) 122 of the robotic system 102 can facilitate detecting the movement of the product material(s) and inspecting the product material(s) for defects and/or discrepancies during a joining operation. A vision device 122 can comprise sensor(s) and/or camera(s) such as, but is not limited to, an RGB-D camera, near IR camera, time of flight camera, Internet protocol (IP) camera, light-field camera, monorail camera, multiplane camera, rapatronic camera, stereo camera, still camera, thermal imaging camera, acoustic camera, rangefinder camera, etc.

A band attachment module 124, when executed by the processor 104, can control the robotic system to implement attachment of, e.g., a collar or neck band, sleeve band, wrist band, waist band or ankle band to a garment. The band control system 126 can control positioning and movement of a band (e.g., a collar band) for attachment to a garment body by the joining device 118. The band control system 126 can ensure appropriate rotation and tensioning of the band to secure the band to the garment as will be discussed. The garment control system 128 can control positioning and movement of a garment (e.g., a shirt) for attachment of the band to it by the joining device 118. The garment control system 128 can provide proper alignment of the garment opening with respect to an edge of the band and can ensure that rotation and tensioning of the garment is appropriate to secure the band. The garment loading assembly 130 can be used to move the opening of the garment on control surfaces of the garment control system 128 for alignment of the opening with the band for joining.

Functioning of a band control system 126 will now be discussed with reference to the example of FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
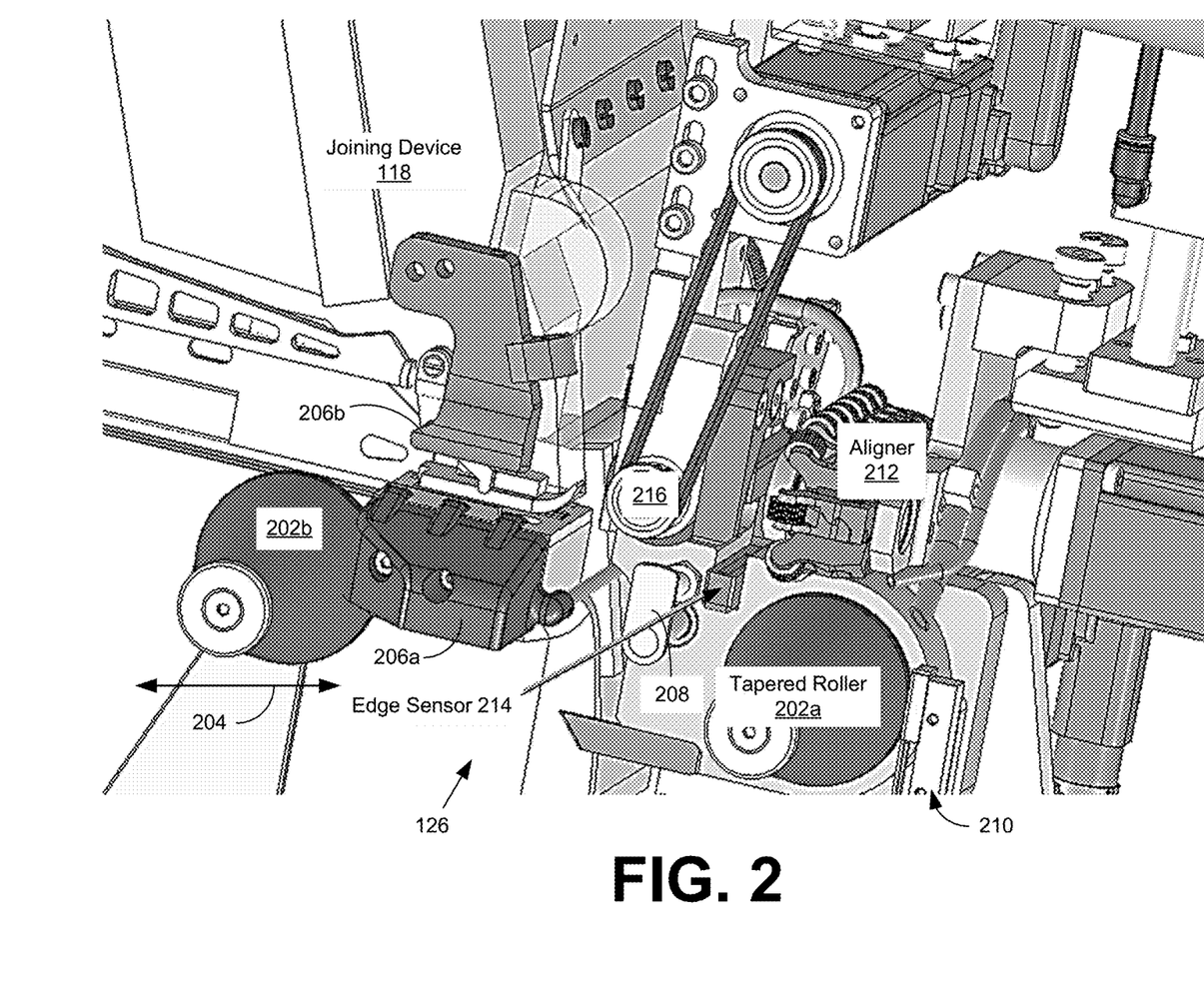
FIG. 2 illustrates an example of a band control system, according to various embodiments of the present disclosure.

FIG. 2 illustrates an example of a band control system 126 that can facilitate attachment of a band to an opening in a garment. The band control system 126 can comprise a plurality of rollers such as, e.g., tapered rollers 202 positioned around the joining head (e.g., a sewing or bonding head) of the joining device 118. While band control system 126 is described with respect to tapered rollers, other roller designs can also be used. At least one of the tapered rollers 202 can be movable. The plurality of rollers can be configured for adjustment, either individually or in combination, to handle bands of different sizes. In the example of FIG. 2, first and second tapered rollers 202 are located on opposite sides of the joining head. A first tapered roller 202a can be in a fixed position and is driven by, e.g., a servomotor, stepper motor, or other controlled driver. A second tapered roller 202b can be an idler roller configured to be displaced in and out (as illustrated by the arrows 204) from the first tapered roller 202a along a substantially linear path to accommodate for the size or material of the band. Additional tapered rollers 202 can be included to direct the band around and through the joining head of the joining device 118. In some embodiments, three, four, or more rollers may be used in a variety of locations. For example, the rollers can be positioned in a combination of adjustable and/or fixed locations around which the band is guided.

For example, the second tapered roller 202b can initially be in a position (e.g., a primary or loading position) with respect to the first tapered roller 202a where a band can be loaded onto the distal ends of the tapered rollers 202. Minimizing the distance between the tapered rollers 202 can aid the loading of the band. The positioning of the tapered rollers 202 can be selected (or adjusted) to account for different band sizes. The band can be manually loaded onto the tapered rollers 202 by an operator or user, or the band can be automatically loaded onto the tapered rollers 202 using, e.g., various mechanical actuators (e.g., pneumatic or servo actuators) or an industrial robot with an end effector. A shoulder at the end of the tapered rollers 202 can prevent the band from falling off the tapered rollers 202.

The tension of the band around the tapered rollers 202 allows it to be driven up the tapered rollers 202 to the desired joining position by rotation of, e.g., the first tapered roller 202a. The positioning of the tapered rollers 202 can be maintained as the band is driven to the desired position. In some embodiments, the band tension can be controlled by adjusting the position of, e.g., the second tapered roller 202b away from the first tapered roller 202a (e.g., a secondary loading position). As the band moves up the tapered rollers 202, the sloped surface of a loading guide 206a mounted with respect to a feed assembly (e.g., adjacent to a feed dog and below a presser foot) of the joining head can guide the band into proper orientation with the feed assembly (e.g., into the gap between the presser foot and the feed dog).

When the band reaches the desired joining position (e.g., at the "top", at the proximal or thickest end, or at another defined position) on the tapered rollers 202, a band guide 208 can be rotated or repositioned adjacent to an edge of the band to prevent it from drifting down the tapered rollers 202. The band guide 208 can include a plate that provides an actuated hard stop that presses against the outer edge of the band (opposite the attachment edge) to trap it in position on the tapered rollers 202. A proximity or other sensor can be used to detect when the band is in position, causing the band guide 209 to operate. For instance, a vision device can be used to detect the position of the band on the tapered rollers 202.

In other embodiments, non-tapered rollers may be used with a more active edge control that can properly position the band for attachment. The band can be placed on two (or more) rolling elements without a taper such as, e.g., wheels, belts or cylindrical rollers. A material aligner (see, e.g., FIG. 2) or appropriate alignment device can be used to position the band in the desired joining position. The material aligner or appropriate alignment device can also be used to align the band edge if adjustment in the joining position is needed.

Where the band includes a seam, it can be positioned on the tapered rollers 202 for proper alignment with the garment opening. For example, a collar seam can be located at the back center of a shirt for aesthetic reasons. A band seam detector 210 can include a sensor (e.g., a proximity sensor) that can detect the seam in the band as it passes by the sensor. Rotation of the first tapered roller 202a can be controlled (e.g., via the servomotor) to position the seam at a desired location. While the band seam detector 210 is shown adjacent to the first tapered roller 202a, the band seam detector 210 can be configured to move away from the loaded band after the band seam has been positioned at the top of the tapered rollers 202 to provide clearance for the garment control system 128 to position the garment opening over the band. The band seam detector 210 can be moved back after the processed garment is removed or after a new band has been loaded on the tapered rollers 202.

With the band at the desired joining position on the tapered rollers 202, the second tapered roller 202b can be adjusted with respect to (e.g., moved back towards or away from) the first tapered roller 202a to a position (e.g., an attachment or secondary position) where the band remains stretched for joining to the garment. In this position, the first and second tapered rollers 202 can align with control surfaces of the garment control system 128 that support and guide the garment opening as will be discussed. As the garment control system is advanced over the tapered rollers 202, the edge of the garment opening can be directed over the band and in position with the feed assembly (e.g., under the presser foot). In addition to the loading guide 206a mounted adjacent to the feed assembly of the joining head, a second loading guide 206b can be mounted adjacent to the feed assembly and over loading guide 206a. Both loading guides 206 can include air jets or orifices configured to direct air toward the garment material as it is advanced over the band. The loading guides 206 can direct air from opposite sides of the garment material towards the feed assembly to assist in removing curl or wrinkles from the material and cause it to be positioned over the band. For example, the air jets can prevent snags and completely extend the material through the feed assembly (e.g., though the gap under the presser foot).

The band control system 126 can also maintain proper alignment of the garment opening with the band for sewing or bonding. Alignment of the opening with the band can be accomplished using a material aligner 212. Material aligners 212 provide traction in one direction to control positioning of the material in that direction, while concurrently allowing movement of the material in a perpendicular direction. For example, the material aligner 212 can comprise a series of rollers that operate as idlers in the feed direction of the joining device 118, while providing controlled movement of the garment material across the width of the band. In the example of FIG. 2, movement of the rollers about the material aligner 212 can shift the garment material from side-to-side on a control surface of the garment control system to keep the edge of the garment opening in position with respect to the edge of the band during the joining (e.g., sewing or bonding) process as the garment material is feed into the joining head. In some embodiments, the edge of the garment opening can be substantially aligned with or can be positioned to extend beyond the edge of the band. By extending beyond the edge of the band, the misalignment of the edge of the garment can ensure proper joining of the band to the garment.

The material aligner 212 can include, but is not limited to, omni-chain material aligners or omni-belt material aligners. An omni-chain material aligner can comprise a circular roller chain extending between two or more sprockets. The rollers of the circular roller chain can provide rolling contact in the feed direction while providing traction in a substantially perpendicular direction. The sprockets can be driven by a motor (e.g., a servomotor or stepper motor) to perform active steering control of the material. FIG. 2 illustrates an example of an omni-belt material aligner comprising a belt (e.g., an indexed belt, chain, etc.) with attached perpendicular rollers, which allow movement of the material in the feed direction and active motorized steering control of the material across the width of the band. In FIG. 2, the rollers are offset from the belt to provide contact with the garment material. Additional details about material aligners are provided in U.S. patent application Ser. No. 16/984,815, entitled "Material Aligner" and filed on Aug. 4, 2020, which is hereby incorporated by reference in its entirety. In other embodiments, an omni-wheel which can be driven in two directions may be used to provide control of the garment material being fed into the joining head. In some embodiments, a contact surface similar to a feed dog can be used to temporarily contact and shift the garment material substantially perpendicular to the feed direction of the joining head.

An edge sensor 214 can be used to monitor the alignment of the opening edge of the garment. For example, the edge sensor 214 can include a fiber optic array, vision device, mechanical sensor, or other appropriate sensor. The edge sensor 214 can monitor the location of the opening edge, which can be used to control the material aligner 212 to maintain the edge of the opening in the proper position.

At least one drive wheel (or "pusher") 216 can be used to control the feed rate of the garment material into the joining head. As illustrated, the drive wheel 216 can be mounted upstream of the joining head of the joining device 118 and downstream of the material aligner 210. This operation can control the stretch of the garment material entering the joining head ensuring proper matching of path distances of the band and garment during joining (e.g., sewing or bonding). Speed of the drive wheel 216 can be controlled using, e.g., a servomotor. In other embodiments, a drive wheel 216 may be combined with the material aligner 210 or may be integrated into a control surface of the garment control system 128. For example, rollers, wheels and/or belts can be located outside the control surface.

As attachment of the garment opening to the band is completed, a garment pusher (or "ejector") can be extended to displace or deflect the joined garment band away from joining head to allow for "sew off" to occur. For instance, the garment pusher moves the garment and band away from a sewing needle, preventing stitches from being placed in the garment material. As the sewing machine runs, a loose chain of stitches is created that can be cut by a chain cutter or tail knife. The garment pusher can be operated using a pneumatic actuator (e.g., a cylinder or plunger) or can be operated with a linear electric motor. The garment pusher can include a projection on the top side of the material to minimize curling of the material as it is pushed aside. In some embodiments, the material aligner 212 can be used to move the garment and band away from the joining head to facilitate sew off.

Functioning of a garment control system 128 will now be discussed with reference to the example of FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 3:
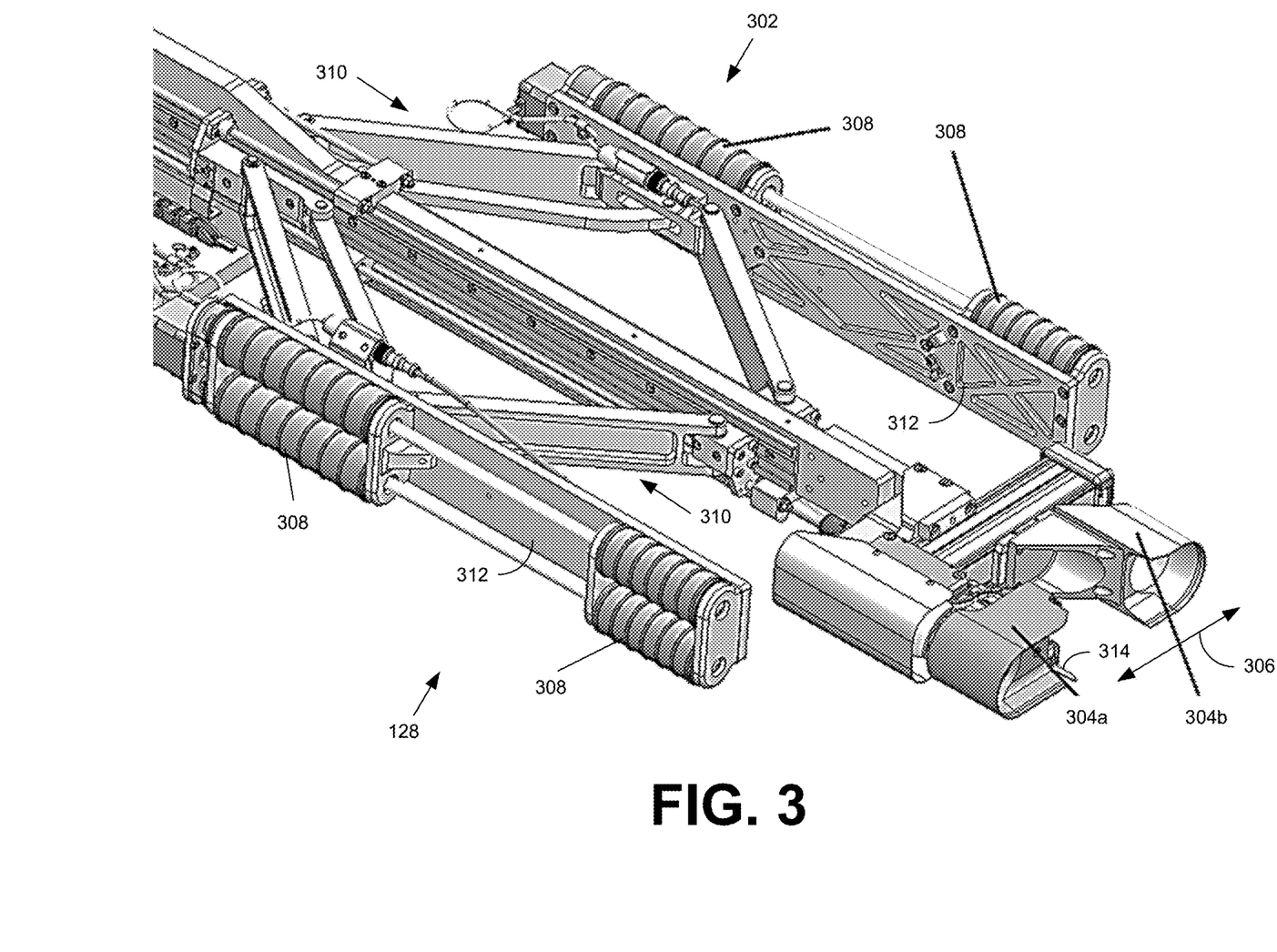
FIG. 3 illustrates an example of a garment control system, according to various embodiments of the present disclosure.

FIG. 3 illustrates an example of a garment control system 128 that can facilitate attachment of a band to an opening in a garment. The garment control system 128 comprises a body holder assembly 302 configured to support and manipulate the garment during attachment of the band by the joining device 118. The garment can be manually loaded onto the body holder assembly 302 by an operator or user, or the garment can be automatically loaded onto the body holder assembly 302 using, e.g., an industrial robot with one or more end effector(s). For example, the garment can include the opening to which the band will be attached and another opening that allows the body holder assembly 302 to be inserted and extend through the garment. In some implementations, the body holder assembly 302 can be configured to be inserted through the opening to which the band will be attached. The body holder assembly 302 can be configured to collapse allowing it to pass through the garment opening. The garment control system 128 can also include a linear guide system along which the body holder assembly 302 can be extended to position the garment for attachment to the band by the joining device 118.

The body holder assembly 302 comprises control surface mandrels 304 that can be used to stretch the opening of the garment that will be attached to the band. The control surface mandrels 304 comprise a smooth, curved surface configured to redirect the band as it passes over the control surface. The control surface mandrels 304 have corresponding positional freedom as the corresponding rollers. In this way, the control surface mandrels 304 can adjust for different sizes of the band and garment opening. For example, a first control surface mandrel 304a can be in a fixed position and a second control surface mandrel 304b can be configured to be displaced in and out (as illustrated by the arrows 306) from the first control surface mandrel 304a along a substantially linear path. In some embodiments, the second control surface mandrel 304b can be positioned by an actuator (e.g., a pneumatic cylinder or piston or a linear electric motor) along, e.g., a guide or rail. In some embodiments, the position of both control surface mandrels 304 can be adjusted.

The body holder assembly 302 can be advanced along the linear guide system substantially perpendicular to the feed direction of the joining device 118. The linear guide system can also allow the body holder assembly 302 to be moved away from the band control system 126. In other embodiments, the body holder assembly 302 can be rotated to provide clearance for loading and unloading the garment and band. When a garment is loaded on the body holder assembly 302, the control surface mandrels 304 extend through the garment opening, which can be supported by the control surfaces, and are adjusted to stretch the opening for positioning over and attachment to a band loaded on the band control system 126 as previously discussed. For example, the second control surface mandrel 304b can initially be in a position (e.g., a primary or loading position) with respect to the first control surface mandrel 304a, allowing the garment to be loaded over the body holder assembly 302 and the control surface mandrels 304 to pass through the opening of the garment. In other embodiments, the control surface mandrels 304 can grip onto an external surface of the garment using handling devices such as, e.g., air flow, vacuum, or mechanical gripping (e.g., a clamp, pinching, pins, or needles) electro-adhesion, adhesion, electro-static forces, freezing, brush, or hook and loop).

The body holder assembly 302 can also include garment body rollers 308 on adjustable wing structures 310. The garment body rollers 308 are located to engage with an internal surface of the garment and configured to rotate the bulk of the garment during attachment to the band. The garment body rollers 308 can be driven at a controlled speed by, e.g., servomotors or stepper motors. The wing structures 310 can be adjusted to extend or retract the garment body rollers 308 for engagement with the garment. In the example of FIG. 3, the wing structures 310 are configured in a scissor arrangement that extends or retracts roller mounting plates 312 using, e.g., a lead screw or other appropriate linear actuator that controls the position of the proximal ends of the scissor legs. Other arrangements can be used to control the extension and positioning of the garment body rollers 308. The position of the garment body rollers 308 may be adjusted along the length of the roller mounting plates 312. As the proximal ends are driven together, the roller mounting plates 312 extend laterally outward while maintaining a substantially parallel relationship. Driving the proximal ends apart causes the roller mounting plates 312 to retract toward the center of the body holder assembly 302. The wing structures 310 can include other configurations that allow for controlled extension and retraction of the garment body rollers 308. In other embodiments, the body holder assembly 302 can utilize other garment support configurations. For example, support rods can be extended through the garment for positioning.

With the garment loaded over the control surface mandrels 304 and garment body rollers 308, the control surface mandrels 304 and body rollers 308 can be extended to engage the garment and hold it in position. One of the control surface mandrels (e.g., the first control surface mandrel 304a) can include a sensor (e.g., a proximity or light sensor) that can detect when the garment has been sufficiently loaded onto the body holder assembly 302 before expanding the control surface mandrels 304 and body rollers 308. For example, the sensor can detect the material of the garment passing over the control surface mandrels 304 and sense when the edge of the opening has moved past the sensor (which is no longer covered by material). This can provide an interlock to ensure that the garment is in position for the attachment operation to proceed.

The control surface mandrels 304 include control surfaces over which the garment material can be rotated. The control surface of the control surface mandrels 304 is a smooth, low friction surface to facilitate movement of the garment material and can adjust the effective circumference to achieve the desired path length for loading and attachment of the garment opening to the band. The control surfaces of the control surface mandrels 304 can have a circular or oval shape that can engage with the garment opening. The control surfaces can split open to expand and contract, or can overlap and slide, exposing hidden sections of the surface. In some embodiments, a multi-prong (or multi-rod) mechanism can be used in place of the control surface mandrels 304. The prongs/rods can create a positive holding device that rotates with the garment.

Figure 5A:
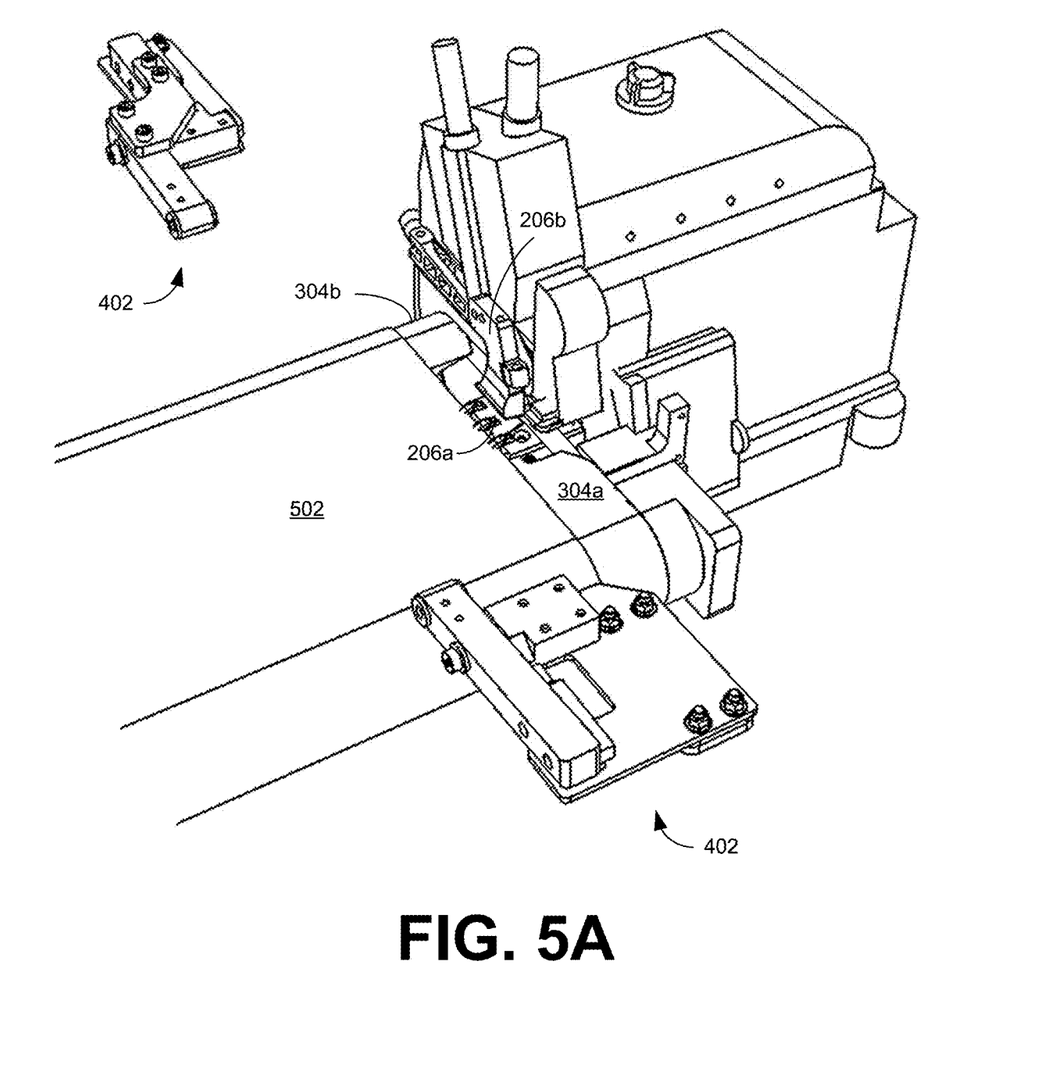
FIGS. 5A-5C illustrate an example of garment loading assembly of FIG. 4 adjusting a garment on the garment control system of FIG. 3 for attachment to a band on the band control system of FIG. 2, according to various embodiments of the present disclosure.
Figure 5B:
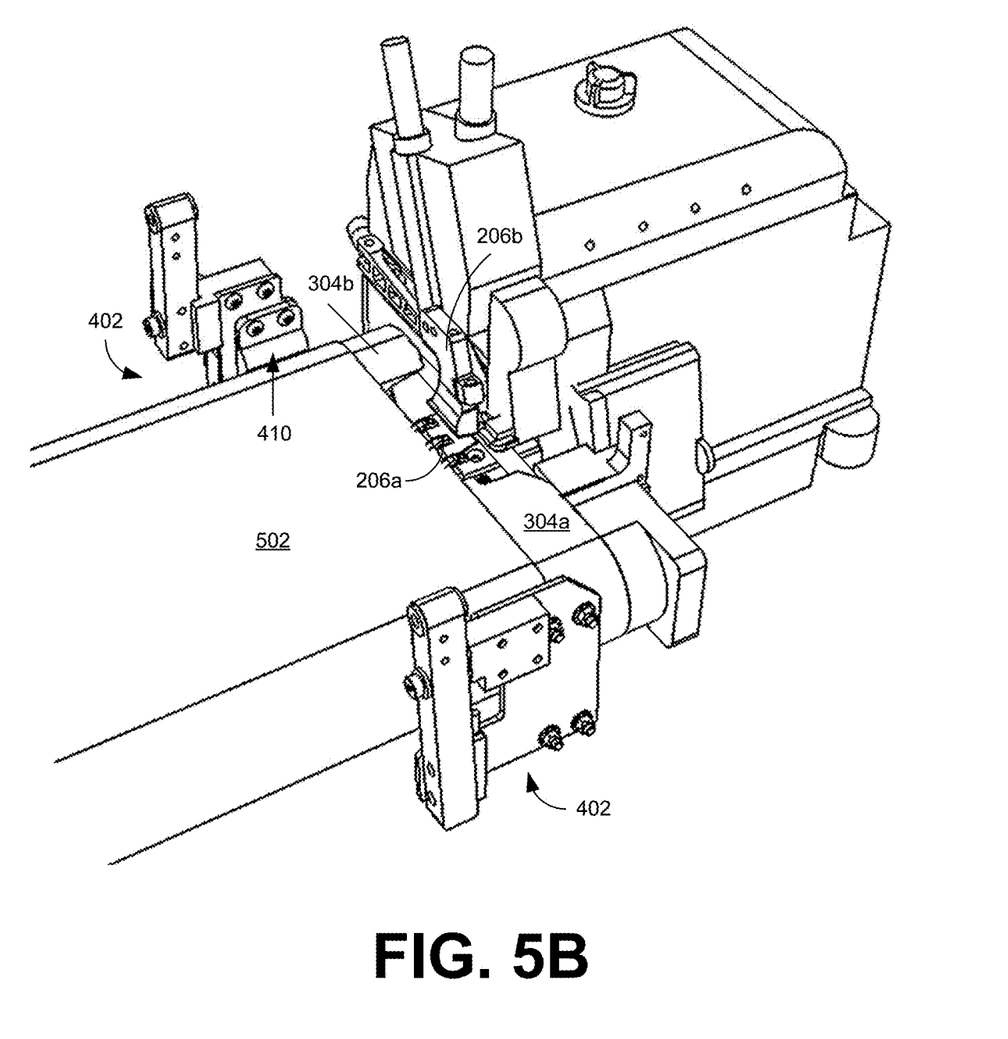
Figure 5C:
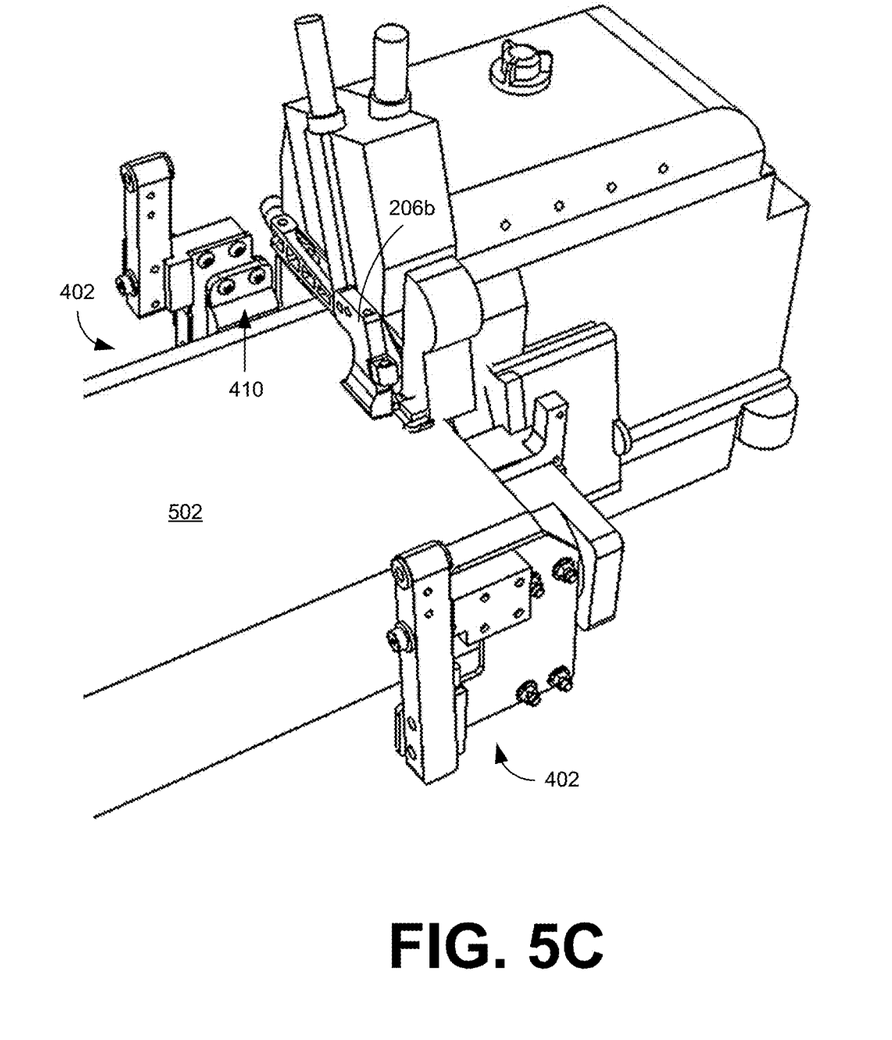

With the garment held in position on the body holder assembly 302 by the garment body rollers 308 and control surface mandrels 304, the body holder assembly 302 can be advanced to engage with the band control system 128. The first control surface mandrel 304a can be in an engaged position, where the control surface is axially extended to cover the first tapered roller 202a. With the control surface extended in the engaged position, the control surface provides a surface over which the garment material can be moved without contacting the band. The body holder assembly 302 is advanced substantially perpendicular to the feed direction of the joining device 118 and with the control surface mandrels 304 aligned with corresponding tapered rollers 202 supporting the band as illustrated in FIGS. 5A-5C. With the control surface mandrels 304 positioned over the tapered rollers 202, the control surface provides a solid surface under the garment material to assist in the operation of the material aligner 212 and drive wheel 216 during the attachment process. With the body holder assembly 302 in this position, the location of the opening of the garment can be adjusted by the garment loading assembly 130 as will be discussed. The control surface mandrels 304 can be configured to allow the joined edge of the garment to progress around the ends of the control surface mandrels 304 as the edges are joined.

The first control surface mandrel 304a disengages during the joining of the band to around the garment opening where it axially retracts to provide a gap or space for the seam to follow through during completion of the joining and sew off. A sensor 314 (e.g., proximity or light sensor) on the first control surface mandrel 304a can detect when the seam reaches the bottom surface of the first control surface mandrel 304a and initiate disengagement to provide the gap or space for the seam.

Functioning of a garment loading assembly 130 will now be discussed with reference to the examples of FIGS. 4 and 5A-5C. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
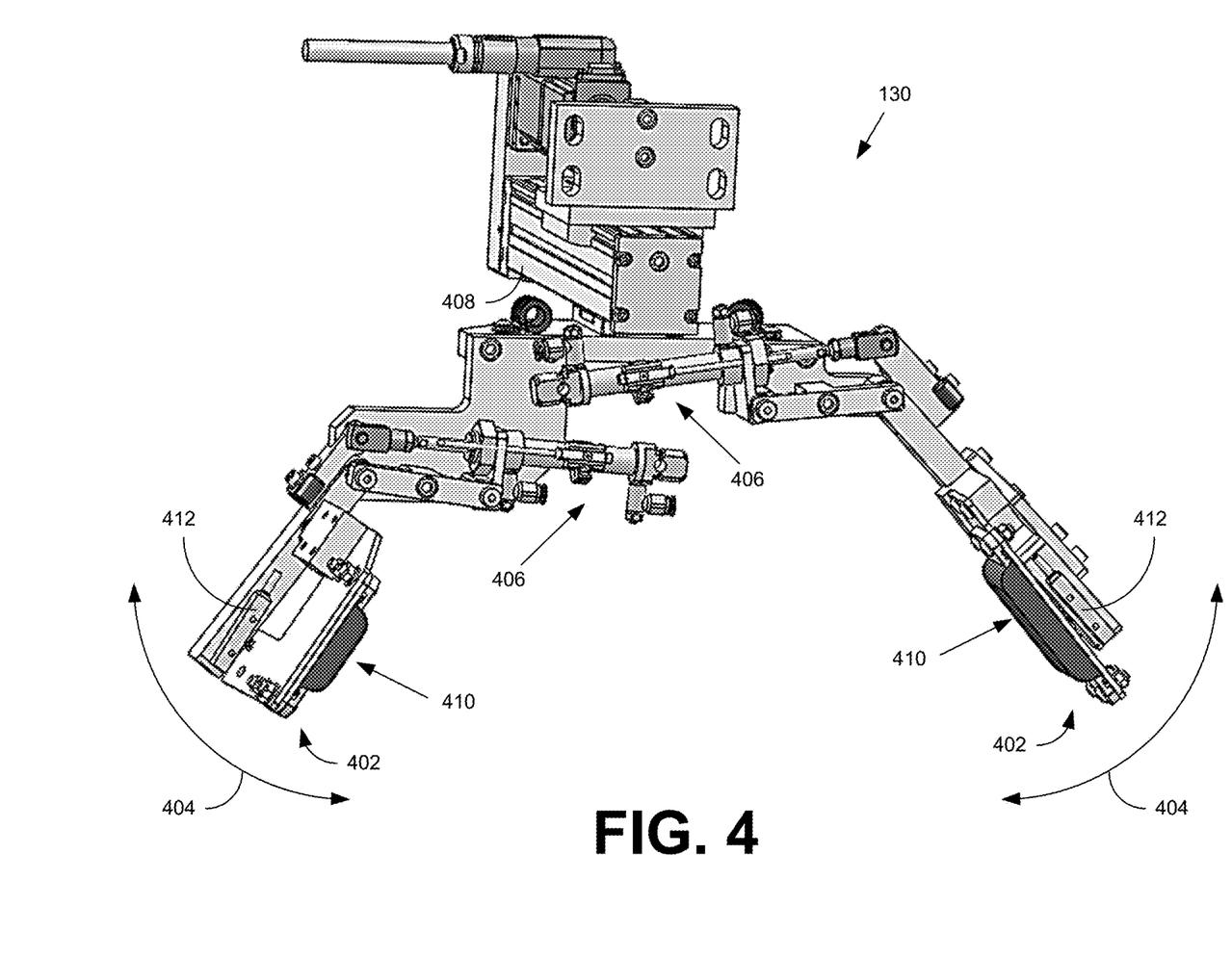
FIG. 4 illustrates an example of a garment loading assembly, according to various embodiments of the present disclosure.

FIG. 4 illustrates an example of a garment loading assembly 130 that can facilitate adjustment of a garment opening for attachment to a band. The garment loading assembly 130 comprises load paddles 402 configured to engage the garment on opposite sides of the garment control system 128. To achieve this, the garment loading assembly 130 can be mounted adjacent to the band control system 126 and over the garment control system 128. The load paddles 402 can be supported by a loading support 408 that allows the load paddles 402 to traverse inward and outward over the garment to facilitate gripping and sliding the garment along the control surfaces of the body holder assembly 302. The load paddles 402 can be rotated (as indicated by arrow 404) outward away from the garment control system 128 to provide clearance for loading or unloading of garments and bands onto the band and garment control systems 126 and 128, and to allow the garment control system 128 to be advanced and aligned with the band control system 126. With the garment control system 128 in position, the load paddles 402 can be rotated (as indicated by arrow 404) downward against the garment. Actuators 406 (e.g., pneumatic or electric linear actuators) can be used to pivot the load paddles 402 or can be used to produce other motion of the load paddles 402.

The load paddles 402 can comprise a contact pad 410 (e.g., foam, rubber, etc.) attached to or located on a backing plate, which can be pivoted at a proximal end. The position of the load paddles 403 can be controlled to engage with the material on the control surfaces. Contact sensors can be used to determine when the load paddles 402 are in contact with the garment material. Pneumatic actuators can provide fine control of the contact forces applied by the contact pad 410 to enable movement of the garment material on the control surfaces. Electrically controlled actuators can also be used. The backing plate can be spring loaded to ensure that sufficient contact force is applied by the contact pad 410 to move the garment. A proximity sensor 412 can detect when the backing plate had compressed the spring sufficiently to ensure the contact force is sufficient to move the garment with the load paddles 402. As the load paddles 402 are pivoted against the garment, the contact pad 410 deflects the backing plate until the proximity sensor indicates that the friction of the contact pad 410 is sufficient for movement of the garment on the body holder assembly 302. The load paddles 402 can then be shifted towards or away from the joining head (e.g., sewing or bonding head) for attachment to the band. After the load paddles 402 have adjusted the garment on the body holder assembly 302, the load paddles 402 can be rotated away from the garment to allow for rotation during attachment to the band. In other embodiment, a plurality of material aligners or rolling elements such as, e.g., wheels or belts can engage with either the inner or external surface of the garment to adjust position of the garment on the body holder assembly 302 in position with respect to the edge of the opening with the edge of the band (e.g., aligned with or overlapping).

Referring to FIGS. 5A-5C, operation of the garment loading assembly 130 is illustrated. The arrangement of components is illustrated without the complete garment loading assembly 130 (FIG. 4) and band control system 126 (FIG. 2) shown to allow the relationship between the load paddles 402 and the garment on the body holder assembly 302 (FIG. 3) to be visible. In the example of FIG. 5A, the body holder assembly 302 is shown with a shirt 502 loaded on it. The shirt 502 is positioned so that the material of the garment does not cover the sensor on the first control surface mandrel 304a. The load paddles 402 are rotated outward to provide clearance for the garment control system 128 to advance. As shown, the control surface mandrels 304 are aligned over the tapered rollers 202 and a collar band supported thereon. As illustrated in FIG. 5A, the collar opening of the shirt 502 does not extend over the collar band.

To adjust the positioning of the shirt 502 for attachment to the collar band, the load paddles 402 are rotated so that the contact pads 410 grip the shirt 502 against the control surface mandrels 304 on opposite sides of the body holder assembly 302 as shown in FIG. 5B. The friction provided by the contact pads 410 allows the garment loading assembly 130 to move the shirt 502 forward or backward along the contact surfaces of the body holder assembly 302. In addition to extending outward to engage with the garment, the garment body rollers 308 can also be shifted forward and backward to adjust the position of the garment body. As the shirt 502 is advanced, the loading guides 206 can direct air from opposite sides of the garment material towards the feed assembly to assist in removing curl or wrinkles from the material and cause it to be positioned over the collar band. For example, the air jets can prevent snags and completely extend the material through the feed assembly (e.g., through the gap under the presser foot). The location of the edge of the collar opening can be determined using, e.g., the edge sensor 214.

FIG. 5C illustrates the edge of the shirt opening in position with respect to the collar band, and ready for attachment by the joining device 118. With the edges aligned or overlapping, the collar band can be attached to shirt 502 using, e.g., a sewing machine. The feed dog establishes the feed rate of the collar band for attachment. The speed of the first tapered roller 202a, the drive wheel 216 and the garment body rollers 308 can all be coordinated to achieve the desired feed rate. For example, the first tapered roller 202a can be underdriven to stretch the band, while the drive wheel 216 and garment body rollers 308 can be overdriven to relieve strain on the garment material during the joining process. As the attachment of the band around the opening of the garment is completed, the garment pusher can be extended to move the processed garment and band away from the joining head, preventing stitches from being placed in the garment material and allowing the processed garment to be separated from the joining device 118.

Functioning of the band attachment module 124 of the robotic system 102 will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
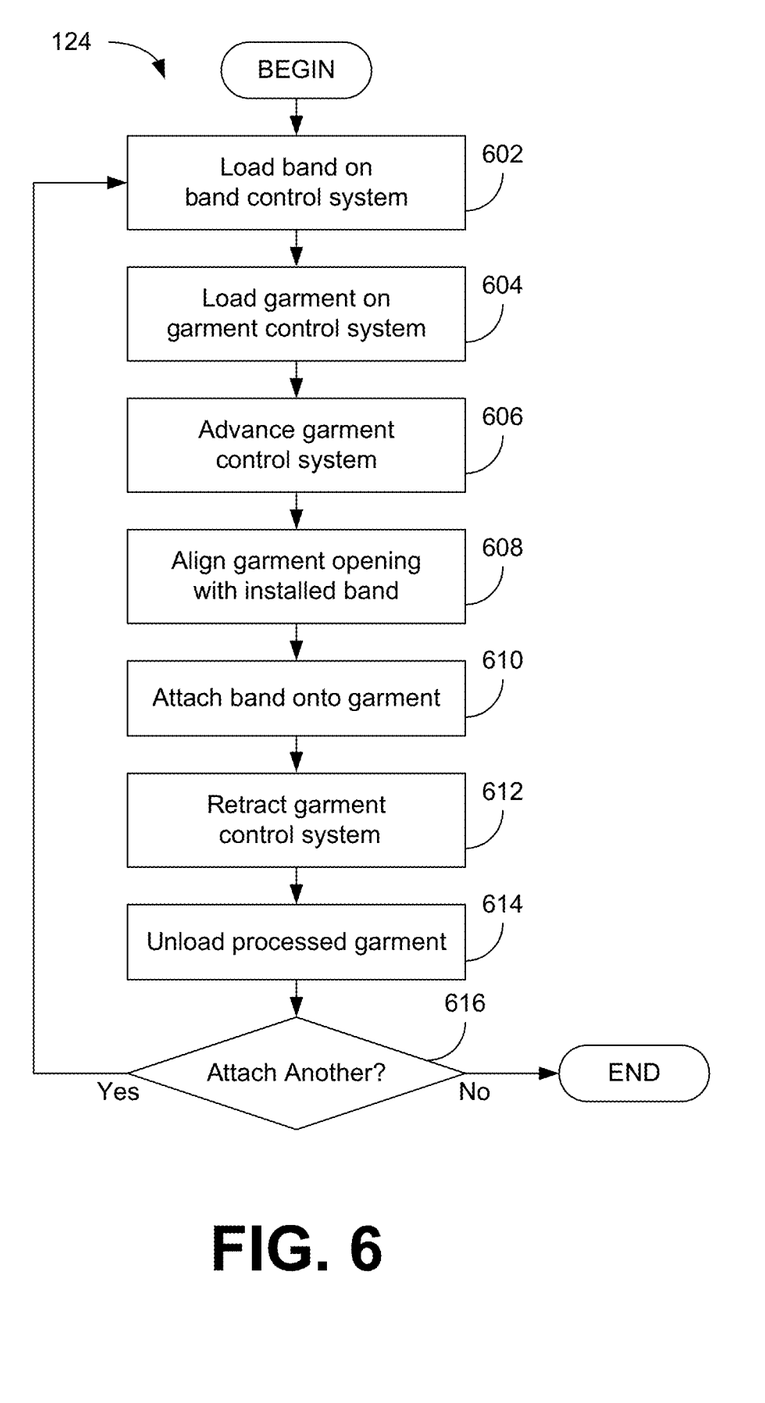
FIG. 6 illustrates an example of a band attachment module, according to various embodiments of the present disclosure.

The flow chart of FIG. 6 shows the architecture, functionality, and operation of a possible implementation of the band attachment module 124 (FIG. 1). The process begins at 602 where a band is loaded on the band control system 126 (FIG. 2). For example, the band can be loaded across tapered rollers 202, which can be driven to move the band into a desired joining position for attachment. The tapered rollers 202 can be in a primary or loading position during placement of the band on the tapered rollers 202. The tapered rollers 202 can remain in that position as the tapered rollers 202 are rotated to drive the band to the joining position. In some embodiments, the tapered rollers 202 can be separated to a secondary loading position where rotation of the tapered rollers 202 drives the band to a joining position at, e.g., the top of the tapered rollers 202. The tapered rollers 202 can then be repositioned (e.g., moved together or apart) to an attachment position with the band stretched for joining. A seam in the band can be moved to a desired location for attachment to a garment, and a band guide 208 can be engaged with the band to hold it in the joining position on the tapered rollers 202. In some embodiments, an omni wheel or the material aligner 212 (or other appropriate material alignment device) can be used to hold the band in the joining position on the tapered rollers 202. In other embodiments, a textured contact surface similar to a feed dog can be used to maintain the band in the desired joining position by temporarily contacting the band perpendicular (or substantially perpendicular) to the feed direction to shift the band on the tapered rollers 202. The placement of the band onto the band control system 126 can be accomplished manually by an operator or user, or can be automated using, e.g., an industrial robot with an end effector. The loading of the band on the tapered rollers 202 can be automatically initiated or can be initiated through an HMI 108 (FIG. 1) by an operator or user.

At 604, the garment is loaded on the body holder assembly 302 of the garment control system 128 (FIG. 3). The garment can be loaded with the control surface mandrels 304 of the garment control system 128 extending through the opening of the garment and the body of the garment extending along a length of the body holder assembly 302. Proper positioning of the opening over the control surface mandrels 304 can be detected by a sensor in a control surface mandrel 304, before separating the control surface mandrels 304 to spread the opening for attachment and extending the garment body rollers 308 to hold and support the garment in position during the attachment process. The installation of the garment on the garment control system 128 can be accomplished manually by an operator or user, or can be automated using, e.g., an industrial robot with an end effector. The loading of the garment on the body holder assembly 302 can be automatically initiated or can be initiated through an HMI 108 by an operator or user.

The garment control system 128 can then advance the garment to the band control system 126 at 606. Advancement of the body holder assembly 302 to align with the tapered rollers 202 can be automatically initiated or can be initiated through an HMI 108 by an operator or user. The control surface mandrels 202 are aligned over the tapered rollers 202 with control surfaces extending over the loaded band with the opening of the garment supported over the band. At 608, the garment opening can be positioned with respect to (e.g., aligned with or extending over) the loaded band using the garment loading assembly 130. The load paddles 402 can contact the garment on opposite sides of the body holder assembly 302 to automatically adjust the garment position until the edge of the opening is aligned with an edge of the band for attachment. Air jets can be used to ensure that the garment material extends through the elements of the joining head (e.g., the gap between the band and the presser foot) of the joining device 118. Positioning of the edge of the garment opening can be detected and controlled using an edge sensor 214 of the band control system.

The garment can then be attached to the band at 610. For example, the band and garment edge can be feed through a joining head (e.g., a sewing head) at a feed rate controlled by a feed assembly (e.g., a feed dog) of the joining device 118. The rotational speed of the tapered rollers 202 can be underdriven to provide the proper stretch of the band during sewing or bonding. A material aligner 212 in contact with the garment material on the control surface of a control surface mandrel 304 can be used to control the position of the opening edge as the garment is advanced for attachment to the band. Positioning of the edge of the garment opening as it is advanced can be detected and controlled using an edge sensor 214 of the band control system. One or more drive wheel(s) 216 in contact with the garment material on the control surface can be used to control the feed rate of the garment material for attachment. For example, a drive wheel 216 located between the joining head of the joining device 118 and the material aligner 212 can be overdriven to relax the strain on the garment material for proper attachment to the band.

As the band is attached to the garment opening, the garment is rotated about the body holder assembly 302 by the garment body rollers 308. The garment body rollers 308 can be overdriven to avoid tensioning of the garment material that may disrupt consistent attachment of the band around the garment opening. As the seam is formed, it advances in a gap along an edge of the second control surface mandrel 304b. As the seam reaches the first control surface mandrel 304a, it can be detected by a sensor which initiates disengagement of the second control surface mandrel 304b to allow the seam to continue advancing in a gap along an edge of the first control surface mandrel 304a. As the attachment of the band to the garment opening is completed, a garment pusher is extended to move the attached garment and band away from the joining head (e.g., sew off), allowing the processed garment to be separated from the joining device 118.

The garment control system 128 can then retract the body holder assembly 302 from the band control system 126 at 612, and the processed garment can be unloaded at 614. The unloading of the garment from the body holder assembly 302 can be accomplished manually by an operator or user, or can be automated using, e.g., an industrial robot with an end effector. If a band is to be attached to another garment at 616, then the flow returns to 602 where the next band is loaded on the band control system. Otherwise, the process can end.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for attaching a band to a garment by a robotic system, comprising:
   loading, by a band control system, a band in a joining position, the band extending between rollers;
   positioning, by a garment control system, an opening of a garment over the band, the opening extending between control surface mandrels and positioned over the band with the control surface mandrels aligned over the rollers; and
   attaching, by a joining device, the band to the garment along an edge of the opening, where alignment of an edge of the band and the edge of the opening is controlled by independently controlling stretch of the band and stretch of the opening of the garment by the band control system.

2. The method of claim 1, wherein the rollers comprise a first tapered roller at a fixed location and a second tapered roller at a variable location.

3. The method of claim 2, wherein loading the band in the joining position comprises positioning the band on the rollers and driving the band to the joining position during rotation of the rollers with the band tensioned between the rollers.

4. The method of claim 3, wherein the rollers are located in a loading position to drive the band to the joining position and adjusted to an attachment position during attachment of the band to the garment.

5. The method of claim 1, wherein the garment control system comprises a body holder assembly configured to support the garment during attachment of the band to the garment, where the body holder assembly is advanced to align the control surface mandrels over the rollers to position the opening of the garment over the band.

6. The method of claim 5, comprising loading the garment on the body holder assembly, wherein the control surface mandrels extend through and stretch the opening of the garment for positioning over the band.

7. The method of claim 6, wherein the body holder assembly is retracted away from the band control system for loading of the garment on the body holder assembly.

8. The method of claim 5, wherein the body holder assembly is configured to rotate the garment about the body holder assembly during attachment of the band.

9. The method of claim 8, wherein rotation of the garment is synchronized with rotation of the opening about the control surface mandrels.

10. The method of claim 8, wherein the body holder assembly includes a plurality of garment body rollers configured to engage a surface of the garment and rotate the garment about the body holder assembly during attachment of the band.

11. The method of claim 1, comprising aligning, by a garment loading assembly, the edge of the opening with the edge of the band, the garment loading assembly configured to adjust position of the garment on the control surface mandrels for alignment of the edge of the opening with the edge of the band.

12. The method of claim 11, wherein the position of the edge of the opening is adjusted based upon a detected position of the edge of the opening.

13. The method of claim 11, wherein position of the garment is adjusted on a body holder assembly by load paddles of the garment loading assembly.

14. The method of claim 1, comprising adjusting, by a material aligner, position of the edge of the opening during attachment, the adjustment substantially perpendicular to the edge of the opening.

15. The method of claim 14, wherein the position of the edge of the opening is adjusted based upon a detected position of the edge of the opening.

16. The method of 1, wherein the joining device is a sewing device.

17. The method of claim 16, wherein the band control system is configured to control feed rate of the opening of the garment to the joining device.

18. The method of claim 17, wherein the feed rate of the opening is controlled by a drive wheel of the band control system.

19. The method of claim 18, wherein the drive wheel rotates the opening of the garment on control surfaces of the control surface mandrels.

20. The method of claim 1, wherein positioning of at least a portion of the rollers and corresponding control surface mandrels are adjusted based upon size of the band.

* * * * *